United States Patent [19]

Onishi et al.

[11] Patent Number: 4,779,019

[45] Date of Patent: Oct. 18, 1988

[54] ELECTROSTRICTION MOTOR

[75] Inventors: Kazumasa Onishi; Mikio Umeda, both of Nagaoka, Japan

[73] Assignee: Alps Electric Co., Ltd., Japan

[21] Appl. No.: 83,799

[22] Filed: Aug. 7, 1987

[30] Foreign Application Priority Data

Oct. 1, 1986 [JP] Japan ................................ 233456/86

[51] Int. Cl.$^4$ ............................................ H01L 41/08
[52] U.S. Cl. .................... 310/323; 310/328; 310/359
[58] Field of Search ................ 310/328, 323, 357–359

[56] References Cited

U.S. PATENT DOCUMENTS

| | | | |
|---|---|---|---|
| 4,504,760 | 3/1985 | Yamamoto | 310/323 |
| 4,645,964 | 2/1987 | Hiramatsu | 310/323 |
| 4,658,172 | 4/1987 | Izukawa | 310/323 X |
| 4,678,956 | 7/1987 | Izukawa | 310/358 X |
| 4,692,649 | 9/1987 | Izukawa | 310/323 X |

*Primary Examiner*—Mark O. Budd
*Attorney, Agent, or Firm*—Guy W. Shoup; Paul J. Winters

[57] ABSTRACT

An electrostriction motor provided with an oscillator having an electrostriction element bonded to an elastic solid, and a moving solid contacted with the phase boundary of the elastic solid of the oscillator. The electrostriction element is continuously polarized in the moving direction of said moving solid to include a directly-expanded and -contracted pole to which a cycle voltage is applied, and dependently-expanded and -contracted poles which are positioned on right and left sides of the directly-expanded and -contracted pole, and it is also polarized in such a way that the directly-expanded and -contracted pole and one of the dependently-expanded and -contracted poles have the same polarity, while the remaining dependently-expanded and -contracted pole has a polarity different from that of the directly-expanded and -contracted pole. Therefore, the electrostriction motor can be driven by a cycle voltage having a single phase, and its supply power circuit and wiring can be made simpler accordingly.

5 Claims, 4 Drawing Sheets (A)

(B)

4,779,019

ELECTROSTRICTION MOTOR

BACKGROUND OF THE INVENTION (a) Field of the Invention

The present invention relates to an electrostriction motor and more particularly, it relates to an electrostriction motor which can be driven generating vibrating waves (or standing waves) when a cycle voltage of single phase is applied.

(b) Prior Art

Various kinds of motors which use electrostriction elements have been proposed. One of them firstly proposed by Japanese Patent Preliminary Publication No. 58-148682 produces linear or rotation movement using progressive waves which are composed of longitudinal and transversal waves excited on the phase boundary of an ultrasonic oscillator. This motor using ultrasonic vibration makes it necessary to apply two or more cycle voltages, different in phase, to the electrostriction element for the purpose of generating the progressive waves which are composed of the longitudinal and transversal waves. However, a complicated power supply circuit is needed to obtain the cycle voltages which are different from each other in phase. Further, a complicated wiring is also needed to apply the cycle voltages to the electrostriction element which is polarized in a specific direction.

SUMMARY OF THE INVENTION

The object of the present invention is therefore to provide an electrostriction motor which can be driven by a cycle voltage of single phase so as to simplify both the power supply circuit and the wiring.

The electrostriction motor of the present invention includes an electrostrictive element in contact with an elastic solid body which has a phase boundary for providing an output force frictionally to an output member, such as a rotor. The electrostrictive element has at least three pole sections arranged in series in a serial direction thereof and aligned first and second opposing surfaces on opposite sides thereof in a thickness direction perpendicular to the serial direction. A common electrode is provided in electrical contact with the first surface, and separate second electrodes are provided in electrical contact with the second surface of the three pole sections. A first, direct pole section of the three pole sections has a first polarization such that it contracts and expands in accordance with an alternating electrical voltage which is applied to the electrodes to create alternating plus and minus electrical fields across the thickness of the direct pole section. Second and third dependent pole sections are provided on opposite sides of the direct pole section in the serial direction, one having the first polarization and the other having the second polarization such that they expand and contract oppositely from each other and to a lesser extent than the direct pole section in accordance with lesser alternating electrical voltages applied thereto. The alternating expansion and contraction of the direct pole section, the lesser, opposite expansion and contraction of the dependent pole sections in the serial direction generates a phased electrostriction output inclined in one direction of said serial direction.

According to the electrostriction element polarized like this, the elastic solid bonded to the electrostriction element generates vibrating waves which are standing waves but can add moving force to the moving solid to rotate or linearly move the moving solid.

DETAILED DESCRIPTION OF THE PREFERRED EMBODIMENT

Figure 1:
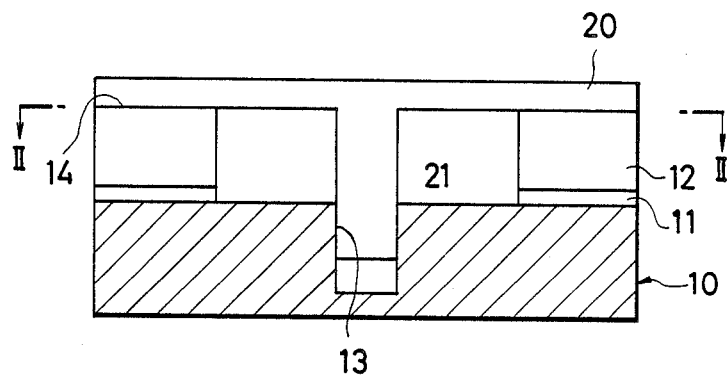
FIG. 1 is a sectional view showing an example of the electrostriction motor according to the present invention.
Figure 2:
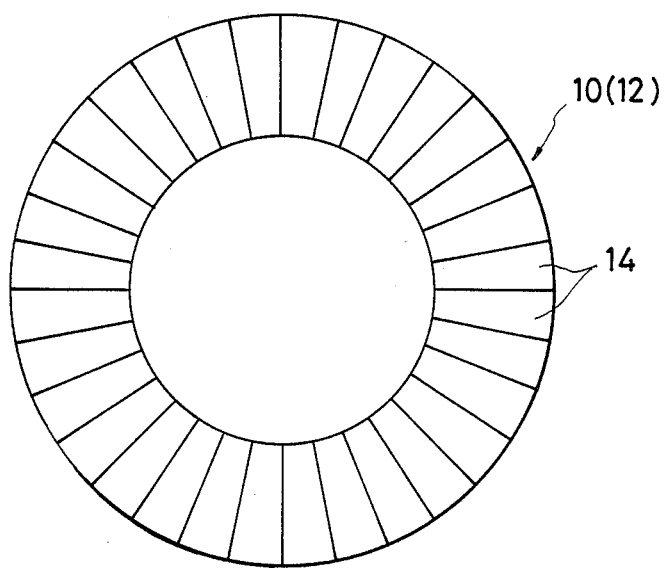
FIG. 2 is a sectional view taken along a line II—II in FIG. 1.

FIGS. 1 and 2 show a mechanical arrangement of the electrostriction motor when it is used as the rotating motor. A fixed oscillator 10 comprises a ring- or disc-shaped electrostriction element 11 and a ring-shaped elastic solid 12 bonded onto the electrostriction element 11. The elastic solid 12 is made of metal such as Al alloy and stainless steel and its upper surface is shaped like a saw so as to enlarge vibrating waves caused by the electrostriction element 11.

Positioned on the oscillator 10 is a rotor 20 coaxial with the electrostriction element 11 and the elastic solid 12. The rotor 20 inserts its axis 21 into a bearing 13 of the oscillator 10, with its underside contacted with a phase boundary (or upper surface) 14 of the elastic solid 12. The rotor 20 is rotated by the vibrating (or standing) waves generated on the phase boundary 14 of the elastic solid 12 when a cycle voltage is applied to the electrostriction element 11.

Figure 3:
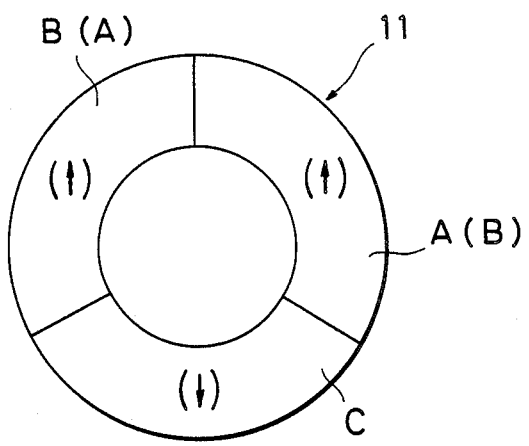
FIGS. 3(A) and 3(B) are plan views showing the most simple polarizations of an electrostriction element.
Figure 3:
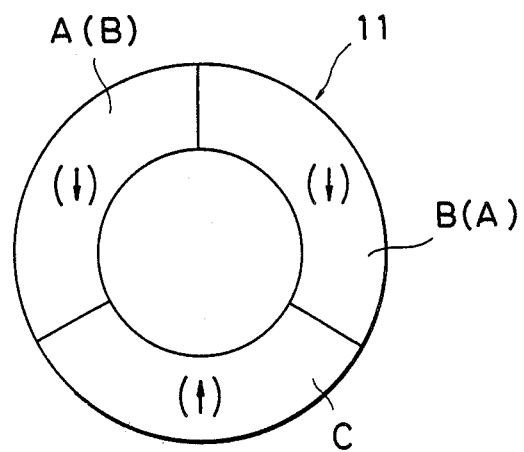
Figure 4:
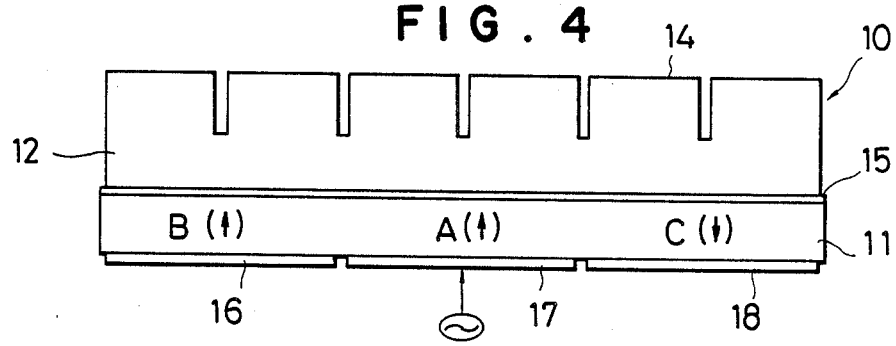
FIG. 4 is a sectional view showing the electrostriction element in FIG. 3(A) developed.
Figure 5:
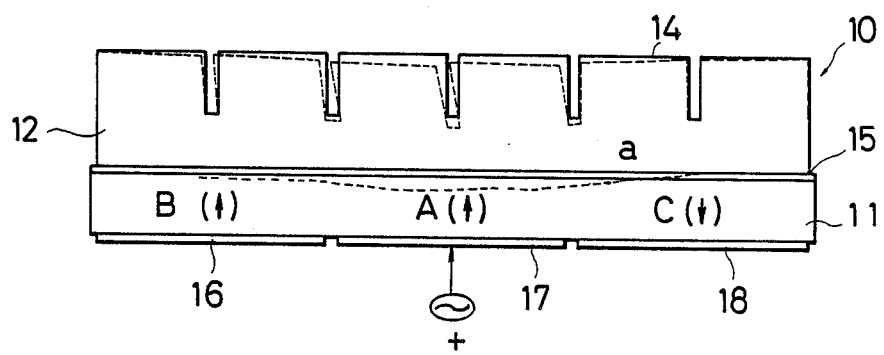
FIGS. 5(A) and 5(B) show how the electrostriction motor of the present invention works.
Figure 5:
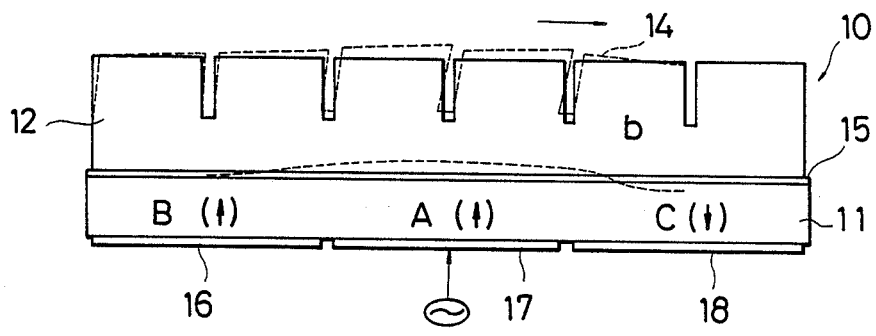

FIGS. 3(A) and 3(B) show the most simple polarizations of the electrostriction element 11 according to the present invention wherein the electrostriction element 11 is polarized into three poles in its circumferential direction. The poles are manufactured to have plus or minus polarization as indicated in the drawings by up and down arrows, respectively. As shown in FIG. 4, a common electrode 15 is attached to the surface of the electrostriction element 11 while electrodes 16, 17 and 18 separated from one another are attached to the underside of the electrostriction element 11 to produce plus (+) and minus (−) electrical fields, as shown in FIGS. 5(A) and 5(B). The plus pole contracts when a plus cycle voltage is applied to this pole and expands when a minus cycle voltage is applied thereto, while the minus pole contracts when the minus cycle voltage is applied to this pole and expands when the plus cycle voltage is applied thereto.

These plus and minus poles are arranged as follows in the present invention. Assuming that one of the three poles polarized to plus and having the separated electrode 17 is a direct pole A to which the cycle voltage is applied, it is arranged that a pole B having the separated electrode 16 is polarized to plus same as the direct pole A and that a pole C having the other separated electrode 18 is polarized to minus different from the polarity of the direct pole A. The poles having the separated electrodes 16 and 18, respectively, are deemed as dependent poles B and C.

FIGS. 5(A) and 5(B) exaggeratedly show deformations caused by the expansion of the electrostriction element 11 and caused on the phase boundary 14 of the elastic solid 12 when the cycle voltage is applied between the common and separated electrodes 15 and 17 for the direct pole A of the electrostriction element 11. When the plus voltage is applied to the separated electrode 17 (or direct pole A), the direct pole A is contracted. Some leaked voltage of the plus voltage which had been applied between the common and separated electrodes 15 and 17 to the dependent poles B and C at this time, thereby causing the dependent pole B to be slightly contracted and the dependent pole C to be slightly expanded, so that the electrostriction element 11 can be deformed like a curve (a). When the direct pole A is taken for a center, the deformation of the electrostriction element 11 is caused asymmetrical in relation to the center of the direct pole A and the contraction inclines toward the dependent pole B. The elastic solid 12 is therefore deformed, as shown in FIG. 5(A). When the minus voltage is applied to the direct pole A at the next moment, the direct pole A expands most, the dependent pole B expands slightly and the dependent pole C contracts slightly, so that the surface of the electrostriction element 11 can be deformed as shown by a curve (b). As the result, force is added to the rotor 20 in a direction shown by an arrow in FIG. 5(B) and the rotor 20 is rotated by a component of this force directed to the plane direction of the phase boundary 14. The rotating direction of the rotor 20 is always toward the dependent pole C which is different in polarity from the direct pole A. When the plus voltage is applied to the direct pole A, no rotating force is added to the rotor 20. When the standing waves are successively generated on the phase boundary 14 of the elastic solid 12, the rotor 20 is continuously rotated.

If the cycle voltage is applied to the separated electrode 16 (or dependent pole B), therefore, the rotor 20 will be rotated to a direction of the dependent pole C which is different in polarity from the voltage-applied pole, that is, in a direction reverse to the above because the polarities of those poles which are positioned on both sides of the pole to which the voltage has been applied are inverted. Even when the electrostriction element 11 is polarized to −, − and +, as shown in FIG. 3(B), and the cycle voltage is applied to either of the minus poles, the rotor 20 is similarly rotated. The polarization is efficient when the electrostriction element 11 is polarized to +, +, − or −, −, +, as described above, but if it were allowed to lower the efficiency a little, the rotating force can be gained even when the number of poles whose polarities are same is increased like +, +, +, −. The essential thing is to establish such a relationship that one of those poles which are positioned on both sides of the direct pole to which the cycle voltage is applied is polarized to have the same polarity as that of the direct pole, while the other is polarized to have a polarity different from that of the direct pole. When this relationship is established, the electrostriction motor of the present invention can be provided.

Figure 6:
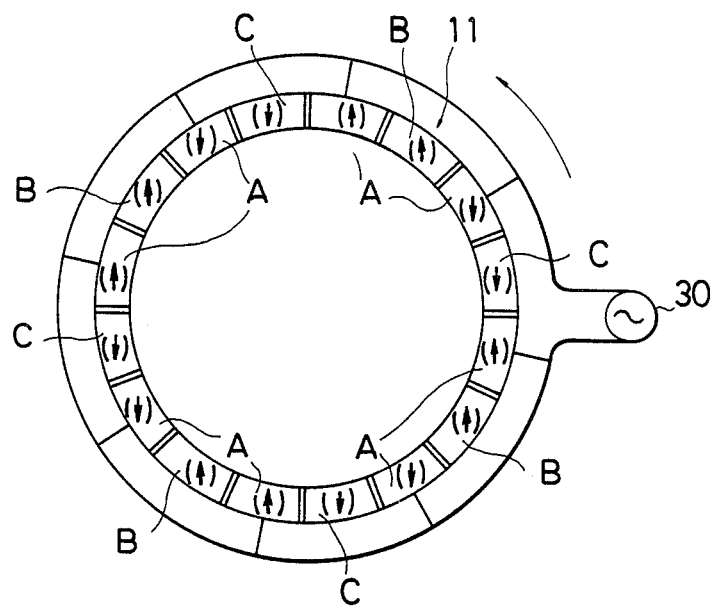
FIGS. 6(A) and 6(B) are plan views showing how the electrostriction element is polarized and how those poles to which voltage is applied are inverted to reverse a rotating direction.
Figure 6:
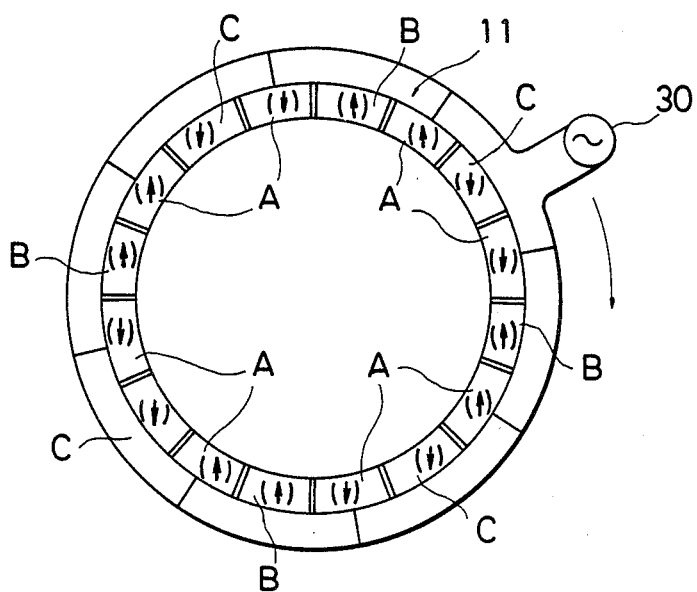

FIGS. 6(A) and 6(B) show a practical embodiment wherein two kinds of patterns shown in FIGS. 3(A) and 3(B) are continuously combined. The polarization comprises repeating a pattern of +, +, −, − in this case and the rotor 20 can be rotated by this polarization.

FIGS. 6(A) and 6(B) show the connections of a cycle voltage source 30 relative to those poles to which driver voltage is applied from the cycle voltage source 30 in a case where the rotor 20 is rotated in two different directions. Arrows show the directions in which the rotor 20 is rotated. The example shown in FIGS. 3(A) and 3(B) is a principle on which the present invention is based, and the number of poles is preferably such a value that most efficiently resonates the electrostriction element 11 with the oscillator 10 which is composed of the elastic solid 12.

When the electrostriction element is made straight, a linear motor can be provided. The rotor is a linearly moving solid in this case. In the case of this linear motor, a further advantage can be obtained. The conventional electrostriction motor using the progressive waves can be theoretically employed as the linear motor, but when it is practically used as the linear motor, there is caused a problem that the progress waves are reflected. Since the oscillator has surely an end, the progress waves are reflected at this final end. These reflected waves are combined with the progressive waves which serve as the driving force for the linear motor, thereby causing the optimum driving force not to be provided. A device for absorbing the progressive waves is therefore needed. In the case of the present invention, however, the driving force is provided using the standing waves and the problem of these reflected waves is not caused fundamentally. The linear motor having a simpler construction can be provided accordingly.

It may also be arranged that the common electrode 15 is on the underside of the electrostriction element 11 while the separated electrodes 16, 17 and 18 on the upper surface thereof.

Although the above is a reasoning for the rotation principle of the electrostriction motor provided according to the present invention, forward and backward rotations of the rotor can be explained without any effort according to the above. When the polarization is not carried out as described above, the rotor cannot be rotated. Further, the fact that the rotor 20 cannot be rotated when the electrostriction element 11 which forms the dependent poles B and C is divided from the direct pole A suggests that the dependent poles B anc C are expanded and contracted by some leaking from the cycle voltage which is applied to the direct pole.

According to the electrostriction motor of the present invention as described above, the moving solid can be moved by the cycle voltage, which has a single phase, in the direction in which the polarization is made continuous. When the direction of polarizing the electrostriction element is ring-shaped, therefore, the motor of the rotation type can be provided. When it is made linear, the motor of the linear type can be provided. The cycle voltage which is applied to the electrostriction element may have a single phase. Both of the supply power circuit and the wiring relative to the electrostriction element can be therefore made simpler, allowing the electrostriction motor to be provided with a lower cost.

We claim:
1. An electrostriction motor comprising:
an electrostrictive element having at least three pole sections arranged in series in a serial direction of said electrostriction element, said pole sections together having aligned first and second opposing surfaces on opposite sides thereof in a thickness direction of said electrostrictive element perpendicular to said serial direction, and each of said pole sections having a predetermined one of opposite first and second polarizations in the thickness direction;

a common first electrode provided in electrical contact with said first surface of said three pole sections;

separate second electrodes provided in electrical contact with said second surface of said three pole sections, respectively;

a first, direct pole section of said three pole sections having a first polarization such that said direct pole section contracts and expands in accordance with an alternating electrical voltage which is applied between said first and second electrodes of said direct pole section so as to create alternating plus and minus electrical fields across the thickness of said direct pole section;

a second, dependent pole section of said three pole sections provided on one side of said direct pole section in the serial direction and having the first polarization such that it contracts and expands corresponding to and to a lesser extent than said direct pole section in accordance with a lesser alternating electrical voltage which is applied between said first and second electrodes of said dependent pole section corresponding to but lesser than said alternating electrical voltage applied to said direct pole section;

a third, other dependent pole section of said three pole sections provided on an opposite side of said direct pole section in the serial direction from the first-mentioned dependent pole section and having the second polarization such that it expands and contracts oppositely to and to a lesser extent than said direct pole section in accordance with a lesser alternating electrical voltage which is applied between said first and second electrodes of said other dependent pole section corresponding to but lesser than said alternating electrical voltage applied to said direct pole section; and voltage applying means for applying said alternating electrical voltage to said direct pole section and said lesser alternating electrical voltages to said two dependent pole sections on the opposite sides of said direct pole section in the serial direction thereof, whereby the alternating expansion and contraction of said direct pole section, the corresponding lesser expansion and contraction of said first-mentioned dependent pole section on the one side, and the opposite, lesser contraction and expansion of said other dependent pole section on the other side of said direct pole section in the serial direction in response to said voltage applying means generates a phased electrostriction output on at least said first surface of said electrostrictive element inclined in one direction of said serial direction.

2. An electrostriction motor in accordance with claim 1, wherein said voltage applying means applies said alternating electrical voltage to said electrodes for said direct pole section, and causes said lesser alternating electrical voltages to be applied to the electrodes for said dependent pole sections by corresponding leakage currents associated with said alternating electrical voltage applied to said direct pole section.

3. An electrostriction motor in accordance with claim 1, wherein said at least three pole sections are arranged circumferentially in the serial direction to provide a rotation output for said motor, further comprising:

an elastic ring-shaped body having a serrated upper surface and a lower surface which is bonded to the first surface of said electrostrictive element; and a rotor provided in frictional contact with said serrated upper surface of said elastic body, whereby said rotor is driven by said phased electrostriction output of said pole sections of said electrostrictive element which transmits an output rotational force in one rotational direction through said elastic ring-shaped body frictionally to the rotor.

4. An electrostriction motor in accordance with claim 3, wherein said three pole sections constitute a closed ring of pole sections of said electrostrictive member, and said alternating electrical voltage is applied to said second pole section as a direct pole section, and said lesser alternating electrical voltages are applied to said first and third pole sections, in order to reverse the rotational direction of the output rotational force of said motor.

5. An electrostriction motor in accordance with claim 1, further comprising at least a fourth pole section having the second polarization provided adjacent said second pole section on the opposite side thereof from said first pole section in the serial direction and corresponding common and separate electrodes on the first and second surfaces in the thickness direction thereof, wherein said alternating electrical voltage is applied to said second pole section as direct pole section, and said lesser alternating electrical voltages are applied to said first and fourth pole sections, in order to reverse the direction of the output force of said motor.

* * * * *